No. 825,710. PATENTED JULY 10, 1906.
W. E. ELLIS.
FASTENER FOR SHOE UPPERS.
APPLICATION FILED AUG. 7, 1903.

Witnesses:-

Inventor:-
W. E. Ellis,
By E. D. Chadwick,
Attorney.

UNITED STATES PATENT OFFICE.

WARREN EUGENE ELLIS, OF HAVERHILL, MASSACHUSETTS, ASSIGNOR TO ELLIS LACER COMPANY, A CORPORATION OF MAINE.

FASTENER FOR SHOE-UPPERS.

No. 825,710.  Specification of Letters Patent.  Patented July 10, 1906.

Application filed August 7, 1903. Serial No. 168,587.

*To all whom it may concern:*

Be it known that I, WARREN EUGENE ELLIS, a citizen of the United States, and a resident of Haverhill, in the county of Essex and State of Massachusetts, have invented new and useful Improvements in Fasteners for Shoe-Uppers, of which the following is a specification.

In United States Letters Patent No. 774,659, granted on the 8th day of November, 1904, I have described and claimed a detachable fastener for shoe-uppers, one form of which is composed of two or more tongues or fingers, each connected at one end to the adjacent tongue or tongues and provided near its free end with an upwardly-extending eyelet-engaging shoulder, said free end being bent away from the shoulder and downward, whereby the fastener is made capable of being disengaged from an upper while under tension and without removing the last or any part thereof from the shoe. My fastener above referred to operates with entire success when used in lasting shoes of the ordinary cut; but it has been found that when used for fastening the uppers of shoes of the "blucher" cut the free ends of one or more of the tongues of the fastener will occasionally become accidentally disengaged from the corresponding eyelets during the handling of the upper preliminary to lasting, this result being due to the fact that the flaps of the blucher upper are much freer at their eyeleted edges and more readily movable than are the flaps of an upper of the ordinary cut, so that there is opportunity for a correspondingly greater amount of play and variation in relative position and arrangement between the parts of the upper and the fastener after the latter has been inserted.

My present invention is an improvement on my patented fastener above referred to; and its object is to make the fastener capable of being used for blucher work without liability of accidental detachment from the upper. I accomplish this result by the construction shown in the accompanying drawings, in which—

Figure 1:
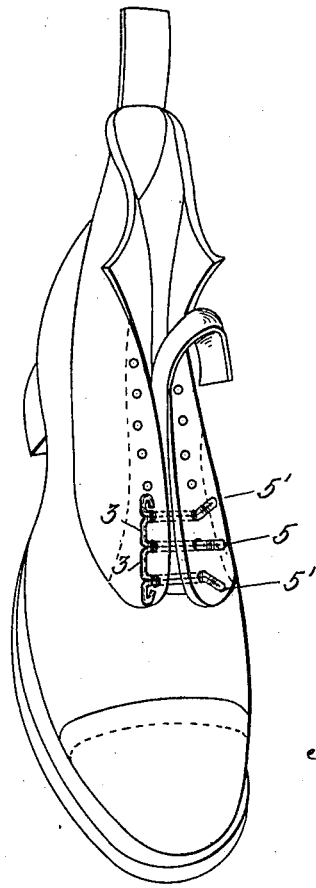
Figure 2:
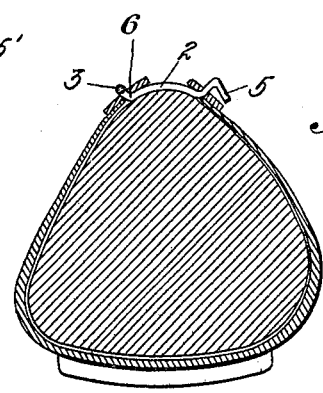

Figure 1 is a perspective view of a blucher shoe with one of my improved fasteners inserted in the upper thereof. Fig. 2 is a transverse section through the shoe, fastener, and contained last; and Fig. 3 is a plan view of the fastener detached.

My fastener is illustrated in the drawings as a three-tongued fastener, this being perhaps the form most commonly used for blucher work; but it is to be understood that my invention may be embodied in a fastener having any desired number of tongues, not less than two.

My fastener is herein shown as composed of a number of substantially parallel tongues or fingers 2, connected at one side of the fastener by transversely-extending portions 3 and each provided near its free end with an upwardly-extending eyelet-engaging shoulder 4, making substantially a right angle with the tongue 2, said free end being bent away from said shoulder, as at 5. The connected ends of the tongues 2 are preferably bent upward sufficiently to form shallow hooks 6 in the respective tongues.

Figure 3:
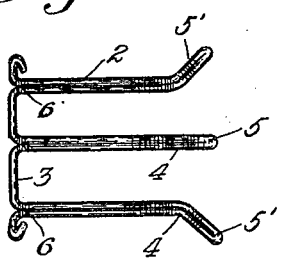

The fastener is usually made of a single piece of steel wire doubled to form the respective tongues 2, as shown in Fig. 3, and each tongue 2 is curved upwardly between its ends to conform substantially to the contour of a last. The constructional features just described are substantially the same as those described in my Letters Patent No. 774,659, above referred to, and provide for the operation of the fastener in the manner therein described—that is to say, the respective tongues are each threaded through two opposite eyelets and hold the parts of the upper in proper relation to each other by the engagement of each hook 6 with one of the eyelets and of the corresponding shoulder 4 with the opposite eyelet, the projecting free ends 5 serving, by bearing against the top of the upper, to keep the adjacent eyelets from slipping off the corresponding shoulders 4 while the upper is being handled preparatory to lasting. When put under the tension of the lasting process, the strain draws the eyelets into the bottom of the respective hooks which contain them, the sides of the upper being thus secured together in an obvious manner. When it is desired to release the upper from the fastener, the eyelets, which are engaged by the shoulders 4, are slipped up said shoulders, over the rounded upper ends thereof, and off the free ends 5, thus entirely removing that side of the upper from the fastener and permitting the sides of the upper to be separated and the last to be withdrawn.

In my aforesaid patented fastener the free ends 5 are all located in substantially parallel planes, so that accidental disengagement of the shoulders 4 from the corresponding eyelets is resisted only by the engagement of said free ends with the upper; but according to my present invention I provide against such accidental disengagement by bending the two end tongues 2 slightly outward in opposite directions or away from the adjacent tongue or tongues, the point of bending preferably coinciding with the location of the bottom of the corresponding shoulder 4. The outwardly-bent ends 5' of the end tongues are clearly shown in Figs. 1 and 3, and the angle made by said ends with their respective tongues 2 is such that by springing the end tongues inward or toward each other the extreme free ends thereof may readily be brought opposite the eyelets through which they are to pass, so that the fastener may be inserted in the usual manner by merely pressing said end tongues inward. After the fastener has thus been inserted the release of the end tongues from pressure will permit them to spring outward into their normal substantially parallel positions, and the outwardly-bent ends 5' in connection with the elasticity of the tongues will then serve as a means for preventing the accidental displacement of the fastener from the upper, such accidental displacement being resisted by the elasticity of the fastener itself. The function of the shoulders 4, however, is not affected by the outward bending of the ends 5', and when it is desired to disengage the upper from the fastener it may be done in precisely the same way as with my previously-patented fastener by merely slipping the eyelets held by the shoulders 4 up and over said shoulders and off the corresponding free ends, the end tongues 2 being sprung inward as the corresponding eyelets pass along their outwardly-bent free ends in a manner the reverse of that which takes place when the fastener is inserted. My present fastener is thus adapted for use with a solid last to the same extent as my previously-patented fastener, and it also has features which give it a greater degree of security against accidental displacement when used for blucher work, as above explained.

With my present construction the free end portions 5 and 5' need not be bent so far over and downward from the upper ends of the shoulders 4 as in my prior fastener, since the outward bending of the ends 5' will ordinarily suffice to hold the fastener in place when not under tension, and the ends 5 will then have no necessary function; but I prefer to retain these ends as in my prior fastener, as I thus obtain additional security against accidental displacement of the fastener, and its insertion is accomplished somewhat more easily.

It will be evident that each laterally-bent free end 5' is independent, so far as the performance of its function is concerned, of the presence or absence of any other such end, because any tongue having its free end portion so bent must necessarily be sprung laterally during the withdrawal of its end 5' and will resist such springing by its inherent stiffness, so that it is not essential to my invention that any specific number of these ends 5' be employed or that they be bent laterally in one direction rather than in the other; but the specific arrangement above described, in which the free ends of the two end tongues only are bent laterally in opposite directions, is my preferred construction, mainly because of the facility with which it can be inserted.

I claim as my invention—

1. A fastener for shoe-uppers comprising a plurality of tongues connected together at one side of the fastener and each provided near its free end with an upwardly-extending, eyelet-engaging shoulder making substantially a right angle with the corresponding tongue, the end portions of the end tongues being bent over, away from the respective shoulders, and being also bent outward in opposite directions through less than a right angle, for the purpose set forth.

2. A fastener for shoe-uppers comprising a plurality of tongues connected together at one side of the fastener and each provided near its free end with an upwardly-extending, eyelet-engaging shoulder making substantially a right angle with the corresponding tongue and having its free end portion bent over, away from said shoulder, one or more of said free end portions being also bent laterally through less than a right angle, for the purpose set forth.

In testimony whereof I have hereunto subscribed my name this 5th day of August, 1903

WARREN EUGENE ELLIS.

Witnesses:
   E. D. CHADWICK,
   JOSEPH T. BRENNAN.